(12) United States Patent
Basteck

(10) Patent No.: US 7,259,471 B2
(45) Date of Patent: Aug. 21, 2007

(54) DRIVE LINE FOR FLUID FLOW POWER ENGINE WITH SPEED GUIDANCE, POWER IMPACT REDUCTION AND SHORT-TERM ENERGY STORAGE

(75) Inventor: Andreas Basteck, Lörrach (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 124 days.

(21) Appl. No.: 10/994,861

(22) Filed: Nov. 22, 2004

(65) Prior Publication Data

US 2005/0146141 A1 Jul. 7, 2005

(30) Foreign Application Priority Data

Dec. 5, 2003 (DE) ................................ 103 57 292

(51) Int. Cl.
*H02P 9/04* (2006.01)
*F03B 13/00* (2006.01)
*F03B 13/10* (2006.01)
*F03D 9/00* (2006.01)

(52) U.S. Cl. ......................................... 290/43; 290/55
(58) Field of Classification Search .................. 290/43, 290/55
See application file for complete search history.

(56) References Cited

U.S. PATENT DOCUMENTS

| | | | | |
|---|---|---|---|---|
| 3,065,652 A | * | 11/1962 | Fritz et al. ....................... 475/5 |
| 3,096,666 A | * | 7/1963 | Christenson et al. .......... 477/59 |
| 3,098,626 A | * | 7/1963 | Messinger ................. 244/53 A |
| 3,128,642 A | * | 4/1964 | Fisher ........................... 477/59 |
| 3,138,923 A | * | 6/1964 | Sven-Olof .................... 60/793 |
| 3,160,029 A | * | 12/1964 | Kraus ........................... 475/48 |
| 3,220,186 A | * | 11/1965 | Burckhardt ................... 60/361 |
| 3,290,963 A | * | 12/1966 | Oldfield et al. ........... 74/665 M |
| 3,326,066 A | * | 6/1967 | Murphy ..................... 74/733.1 |
| 3,386,540 A | * | 6/1968 | Horsch et al. ................ 477/59 |
| 3,416,309 A | * | 12/1968 | Elmes et al. ................ 60/39.15 |
| 3,942,026 A | * | 3/1976 | Carter .......................... 290/55 |
| 3,983,693 A | * | 10/1976 | Werner ......................... 60/788 |
| 4,280,061 A | | 7/1981 | Lawson-Tancred .......... 290/55 |
| 4,513,206 A | * | 4/1985 | Gervasio et al. ............ 290/4 C |

(Continued)

FOREIGN PATENT DOCUMENTS

| | | |
|---|---|---|
| DE | 1 104 458 | 11/1961 |
| EP | 1 283 359 | 2/2003 |

*Primary Examiner*—Darren Schuberg
*Assistant Examiner*—Pedro J. Cuevas
(74) *Attorney, Agent, or Firm*—Baker & Daniels LLP

(57) ABSTRACT

Control procedure for a flow machine, wherein the flow machine comprises a turbine, which picks up power from a wind or water current, and a driveline, which transfers power from the turbine to an electric generator connected to an electricity grid of constant grid frequency. A power distribution transmission arranged on the input side of the driveline splits power to first and second power branches. A hydrodynamic convefler connects the first and second power branches on the output side of the driveline and the first power branch drives the electric generator with constant speed. The reaction member of the hydrodynamic converter is set to a constant position for a turbine speed below a chosen threshold and above the threshold the reaction member is controlled to maintain a medium speed of the turbine being a function of the momentum picked up by the turbine.

20 Claims, 11 Drawing Sheets

U.S. PATENT DOCUMENTS

| | | | | |
|---|---|---|---|---|
| 4,585,950 A * | 4/1986 | Lund | | 290/44 |
| 4,774,855 A * | 10/1988 | Murrell et al. | | 475/31 |
| 4,907,474 A * | 3/1990 | Bolger | | 475/14 |
| 5,222,924 A * | 6/1993 | Shin et al. | | 475/329 |
| 5,785,143 A * | 7/1998 | Leber et al. | | 180/374 |
| 6,595,077 B1 * | 7/2003 | Geiberger et al. | | 74/330 |
| 6,920,383 B2 * | 7/2005 | Graf et al. | | 701/51 |
| 6,921,349 B2 * | 7/2005 | Glockler | | 475/210 |
| 6,951,101 B2 * | 10/2005 | Nitsche et al. | | 60/329 |
| 6,952,981 B2 * | 10/2005 | Fischer et al. | | 74/733.1 |
| 6,966,860 B2 * | 11/2005 | Heitmann et al. | | 475/10 |
| 6,984,190 B2 * | 1/2006 | Legner | | 477/53 |
| 6,997,851 B2 * | 2/2006 | Hofler | | 477/107 |
| 7,017,722 B2 * | 3/2006 | Leber | | 192/3.27 |
| 7,022,044 B2 * | 4/2006 | Legner et al. | | 477/68 |
| 7,042,113 B2 * | 5/2006 | Aukon | | 290/54 |
| 7,044,713 B2 * | 5/2006 | Joo | | 416/201 A |
| 7,081,689 B2 * | 7/2006 | Tilscher et al. | | 290/44 |
| 2003/0015877 A1 * | 1/2003 | Schlemenat | | 290/55 |
| 2003/0159438 A1 * | 8/2003 | Vogelsang et al. | | 60/330 |
| 2004/0050206 A1 * | 3/2004 | Fischer et al. | | 74/730.1 |
| 2004/0096327 A1 * | 5/2004 | Appa et al. | | 416/1 |
| 2004/0157701 A1 * | 8/2004 | Legner | | 477/53 |
| 2004/0216971 A1 * | 11/2004 | Johann et al. | | 192/3.26 |
| 2004/0248693 A1 * | 12/2004 | Korner et al. | | 475/269 |
| 2004/0266578 A1 * | 12/2004 | Glockler | | 475/210 |
| 2005/0146141 A1 * | 7/2005 | Basteck | | 290/44 |
| 2005/0173927 A1 * | 8/2005 | Aukon | | 290/43 |
| 2005/0241873 A1 * | 11/2005 | Hofler | | 180/306 |
| 2006/0128514 A1 * | 6/2006 | Glockler | | 475/207 |
| 2006/0138780 A1 * | 6/2006 | Flamang et al. | | 290/55 |
| 2007/0007769 A1 * | 1/2007 | Basteck | | 290/1 C |
| 2007/0012129 A1 * | 1/2007 | Maty et al. | | 74/395 |

* cited by examiner

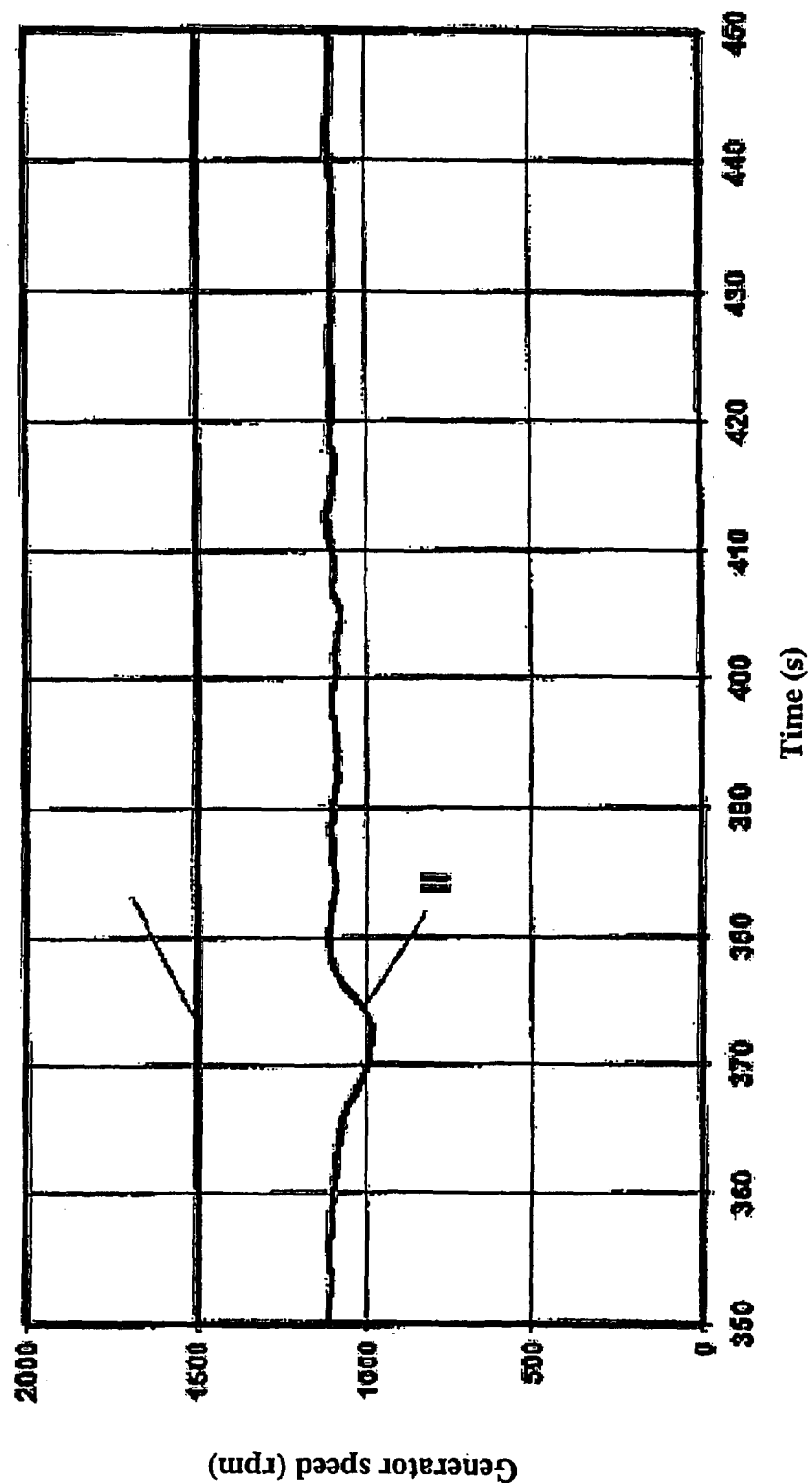

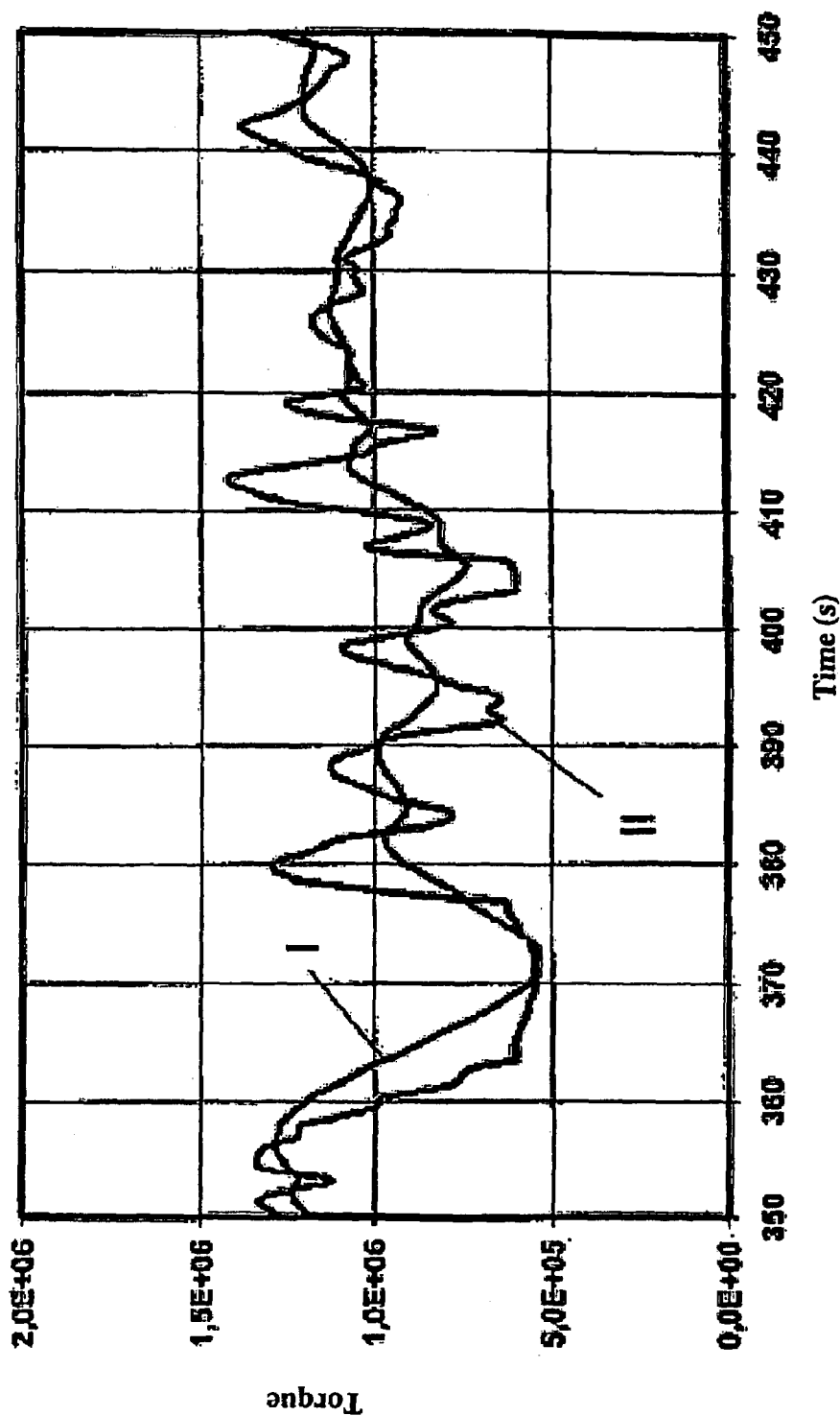

DRIVE LINE FOR FLUID FLOW POWER ENGINE WITH SPEED GUIDANCE, POWER IMPACT REDUCTION AND SHORT-TERM ENERGY STORAGE

BACKGROUND OF THE INVENTION

The invention refers to a drive line which picks up power from a fluid flow power engine, such as a wind or water power machine, and transfers this to an electrical generator and which features a speed guide, a power impact reduction as well as a short-term energy storage facility.

Fluid flow engines which avail themselves of natural resources such as wind and water power, for the drive of an electrical generator make particular demands upon a drive line in terms of output transfer. It is typical that a heavily fluctuating output yield is available in the temporal flow process at the input shaft of the drive line. Additionally, there must be taken into account the particular problems involved in the characteristics and dynamics during the energy conversion of the kinetic energy of the fluid flow medium into the kinetic energy of the power intake, such as a wind power motor or a water power turbine. There thereby exists on the input shaft of a drive line for fluid flow power engines a system-inherent characteristic for the output conversion, which allocates a particular flow speed of the medium present (e.g. air and water) an optimal revolution speed/revolution momentum ratio according to the rapid-run count for the power intake, which, in its turn, is dependent upon the geometry and the design of the power input facility.

If it is the case that the drive line drives an electrical generator which feeds electrical energy into an electrical power supply grid, then it must be taken into account that the network frequency predominantly demonstrates a constant level. Fluctuations in the network frequency exist only to a very small extent since the dimension of this is drawn directly from the network itself.

The previously described requirements of a drive line are in particular in existence in the case of wind power plants. Here a variable power input is taken in by the wind power engine, in addition the wind power rotor has to feature a certain revolution speed which is dependent upon the wind speed in order to be able to extract optimal mechanical energy out of the air stream. In the following therefore there will be illustrated, using the example of a wind power plant, the problems involved in a speed-guided drive line with power impact reduction and short-term energy storage.

If, initially, the requirements made upon a drive line of a wind power plant are considered from the generator side, then an initial solution for the connection of an electrical generator onto the grid can be to design the entire drive line and thereby also the wind power rotor as fixed-speed. Such fixed-speed wind power plants can, when non-synchronous generators are being used, be connected in a simple form and manner to the voltage of an electrical power supply grid as electrical engines based upon the principles of conditional slip. Hereby the speed constancy will be conveyed to the drive line by the transmission on the wind rotor, so that the wind rotor does not travel at its optimum power output at varying wind speeds. It is a particular disadvantage of fixed-speed wind power plants that they, in particular when partially loaded, which is frequently the case with typical wind conditions, can only be operated with limited efficiency.

If a wind power plant in general, and in particular in the area of partial loading, is operated with variable speeds, then there arises the possibility of designing a drive line with either variable or constant output speed. Thereby, in both cases, the power output is also temporally changeable on account of the temporally varying momentum.

The first case leads to the use in wind power plant of frequency converters which motivate the generator with the required frequency or, respectively, provide compensations to the difference of the existing grid frequency and thereby make possible a variable-speed generator. This formulation however leads us away from the task herein illustrated and is particularly invested with difficulties, such as the complexity of the regulation and control circuits, the difficult to map parabolic characteristics of the wind rotor in the frequency converter, the stiffness of the defined generator characteristic curve by the frequency converter, of the low level of operational reliability in cases of high environmental burdens, a grid feed-in quality which can only be operated by extremely elaborate means such as e.g. low harmonic loading and the production of reactive volt-amperes.

The second case, namely to connect a variable rotor speed of the wind power plant with a constant generator speed without frequency converter, represents the topic here illustrated of a drive line for the transfer of a variable power with a variable input speed and constant output speed. The known solutions to this problem, in particular for wind power plant, deploy an overlay transmission which is used to split the mechanical power up into branches. In the case of variable-speed wind power plants there have become known two cases based upon this and which are used in order to keep the generator frequency at a constant level.

In the first system the input power is distributed via the overlay transmission between a large generator as well as a small servo-motor whereby it is generally the case that approximately 30% of the input power is relayed to the servo-motor. The generator is connected at fixed-speed to the grid or is fed via an auxiliary generator which is mechanically coupled to the generator. In order to stabilize the generator speed the servo-motor is either operated as a motor or as a generator with varying frequencies. In this kind of system the same problems exist as in the frequency-regulated generators.

In the second system, which works hydrostatically, instead of the electrical servo-motor hydraulic motors and pumps are used. Here also the problems arise of a difficult regulation characteristic, in particular of a laziness of response and relevant dead periods as well as pronounced non-linear features. Furthermore the hydraulic system components are disadvantageous on account of their elaborate design.

In addition to the previously described requirements for a drive line for fluid flow engines for connection to an electrical generator there arises in particular in connection with wind power plant the peculiarity that the tips of the rotor blades are not supposed to exceed a certain speed in order to reduce to a defined level the noise development which can be perceived to be disruptive. Depending upon the diameter of the wind power rotors, it is therefore necessary to limit their revolution speed to a certain maximum amount or, respectively, above a certain speed threshold, depending upon the wind-loading, to prescribe a speed sequence which, as near as possible, does not exceed a certain maximum level which however can vary, depending upon each location, for example whether an onshore or offshore location. In order to fulfill this stipulation a frequency converter on the generator can be used which imprints the required speed by means of its frequency on the generator and thereby limits the speed of the wind power rotor. This however requires the use of the solution explained above together with all of its disadvantages.

When using frequency converters the possibility arises that, where a substantially constantly sustained speed of the wind power motor via the variation of the torque relayed by the drive line, can also relay a variable power onto the generator, a power which is dependent upon the available kinetic energy of the airflow. It is however disadvantageous that, on account of the converter technology deployed, hitherto only a fixed speed guide along a prescribed nominal curve could be attained and thus it is in particular not possible to react to short-term fluctuations in wind flow. As a consequence, loading impacts resulting from gusts of wind cannot be compensated for by means of a short-term speed alteration and, as a consequence, have a direct effect on the generator and the mechanical structures. This is in particular to be regarded as being disadvantageous in respect of the loading accumulation and the operating period of the wind power plant connected thereto.

SUMMARY OF THE INVENTION

At the basis of the invention is the task is to provide a drive line for fluid flow engines, and in particular for wind power and waterpower engines, which allows for speed guidance. Hereby, on the one hand, the drive speed of the drive line for the drive of an electrical generator is supposed to stay constant by means of the imprint from the grid, and on the other hand the speed on the input shaft shall be limited to a certain nominal sequence dependent upon the momentum entered in, or to a constant level decided upon. In particular, under operational conditions of full loading, during which the input side speed of the drive line is limited, the drive line is supposed to feature, by virtue of a sufficient softness in reaction, or , respectively, the ability during overloading to effect a short-term storage of energy, with which it is possible, in particular, to cushion the subjection to short-term power fluctuations on the input of the drive line, and also to utilize these.

In order to provide a solution to this problem the inventor has initially recognized that a drive line in accordance with the requirements has to be constructed which consists of a combination of a power-distributing transmission with a hydrodynamic servo torque converter.

The input shaft of the power-distributing transmission is, in so doing, at least directly connected with a power input of a fluid flow engine, for a wind power plant this is, for example, a wind power rotor, for a waterpower plant the appropriate turbine. As possible intermediate elements between the power input and the entrance to the power-distributing transmission there can be deployed, for instance, transmission gears, but a fixed coupling is also possible.

In the power-distributing transmission, which can, for example, be constructed as a planetary gearset transmission with variable transmission ratios, there are two power branches built in. In the first power branch the output shaft of the drive line is driven with a mechanical power provided by the wind rotor, whereby this output shaft is at least directly coupled with the electrical generator. It is hereby necessary that the output shaft for the generator drive turns over at a constant speed. In order to achieve this a hydrodynamic converter with its pump wheel is at least directly driven from the output shaft of the drive line, whereby there exists a direct coupling between output shaft and pump wheel. A prerequisite of this is that the output shaft is fed by means of a transfer in the power-distributor transmission with a speed which is, by comparison to the speed of the input shaft, appreciably higher. A typical speed for the electrical generator is, for instance, 1500 U/min. With revolution speeds as high as this on the output shaft it is, by the same token, possible to have an effective operation of the hydrodynamic servo-converter.

When the wind power plant is started up, initially the input shaft and the output shaft of the drive line accelerate until the electrical generator which is connected with the output shaft attains its nominal speed level and a synchronization with the electrical grid into which the generator is coupled, can be effected. In the then attained normal operation condition the grid frequency imprints onto the electrical generator, and thereby onto the output shaft of the drive line, the prescribed nominal speed.

Independently of the position of the reaction member of the hydrodynamic servo-converter, under typical circumstances a stator with guide blades, there takes place a specific power input of the pump and of the power transfer connected with it onto the turbine wheel of the hydrodynamic servo-converter. This has the consequence that, because characteristics inherent in the system emanating from the energy conversion out of an airflow into the kinetic energy of a wind power rotor and the system characteristics of the servo-converter, the conversion ratios in the power-distributor transmission and the reaction member of the hydrodynamic converter can be adjusted in such a way that, by means of a regulation effect inherent in the system of the servo-converter in connection with the overlay transmission in general as well as in particular in the partial-loading area of the wind power turbine, an optimal input speed for the wind power rotor on the input shaft with the imprinted constant generator speed on the output shaft of the drive line can be attained. This is inclusive of the fact that wind rotor and servo-converter feature, as fluid flow engines, the same characteristics of speed/power and speed/momentum and, on account of the concordance of their system behavior, and that such identical behavioral patterns are required.

In order to reach a revolution speed limitation on the input shaft of the drive line, now, in a further step, the adjustment of the converter is undertaken by means of the reaction members in such a way that an altered speed torque ratio on the hydrodynamic servo-converter adjusts itself and thereby also a new conversion ratio in the power-distributor transmission results, which in its turn leads to a self-adjustment of the input shaft of the invention-like drive line, and thereby for the wind power rotor, in a certain speed torque ratio. After this invention-like procedure, there is built up by means of a deliberate shifting of the parabolic characteristics and thereby a "de-adjustment" of the hydrodynamic servo-converter in the drive line, such an exaggerated counter momentum for the wind power rotor that this is indeed not able to take advantage of the optimal power of the airflow, however accepts a certain, selected revolution speed.

With the procedure it can successfully be achieved that the rotation speed of the wind power rotor is kept to a level beneath the threshold speed field which is critical for the development of noise. Alternatively, when a certain speed in the wind power rotor is exceeded, a certain attuned speed limitation curve sets in which is exclusively dependent upon the momentum from the airflow applying itself to the wind power rotor. Such an imprinted speed sequence on the wind power rotor can, for example, be selected as explicitly steep, more or less constant, or, by the same token, it is possible also to permit, with increasing wind power, a certain increase in the speed, which the inherent softness in the system of the invention-like drive line additional supports.

The drive line with power-distributor transmission and hydrodynamic servo-converter with pick-off from the output shaft and power reflux onto the power-distributor transmission is designed in such a way that by means of the coordination of the mechanical transmission components the optimal pick-up characteristics of the wind power rotor, which has features closely resembling a parabolic flow progression, are mapped by the drive line. For such an adjustment possibility in the drive line there can be achieved, for an in principle unvarying adjustment of the reaction member of the hydrodynamic servo-converter, a variable power input, the guidance of the wind rotor along the optimal speed to power input as well as a constant generator speed. This effect, which leads to a self-regulation of the output speed of the drive line which is simply dependant upon the layout, which can be explained as follows, namely that the hydrodynamic converter, which allows power to flow back to the power-distributor transmission, by the same token features a parabolic characteristic. When the hydrodynamic servo-converter is "de-adjusted" by the shifting of the reaction member, then the transfer behavior of the drive line is relocated to a new speed-torque characteristic curve, which then, in its turn, dependant upon the air flow speed can be passed through and also features a parabolic characteristic.

For the setting of a certain speed of the wind power rotor, for instance of a constant speed above a determined speed threshold, it is necessary to select a certain adjustment via the reaction element of the hydrodynamic servo-converter and consequently a certain, new work point. On the basis of this occurrence there arises the advantage that each selected work point lies on an approximately parabolic characteristics curve, so that for short-term fluctuations in the power input, such as there could arise as a result of gusts of wind, the previously described self-regulation characteristic of the drive line seizes in each case upon the selected work point. This leads, on the one hand, to a cushioning of the impact from gusts of wind on the electrical generator and the entire mechanism of the drive line. On the other hand it is possible, under the influence of a gust of wind, for the input speed of the drive line to be, to a certain extent, accelerated, thereby there arises, for the acceleration of the wind rotor and the drive line, a power input which leads to a reduction of momentum increase in the drive line and reduces the short-term fluctuation field of the energy production in the electrical generator, whereby the drive line in respect of its input speed after the dying down of the wind gusts, will, on account of its self-regulation characteristics, once again return to the selected work point and hands over the currently present additional kinetic energy from the wind rotor and the drive line to the generator.

BRIEF DESCRIPTION OF THE DRAWINGS

Below the procedure according to the invention is more exactly described by reference to illustration figures. The following are illustrated individually therein:

FIGS. 7a to 7d show the comparison of the torque imprint in the drive line by means of the existing solution of wind power plants with frequency converters and constant transmission gearing and a power-distributor wind power plant with a servo-converter on the output side.

DETAILED DESCRIPTION

The rotor power $P_R$ of a wind power plant is approximately in the following relationship to wind speed $V_w$:

$$P_R = k \, c_p(V_w, \omega_R, \beta) \, v_w^3$$

Hereby k refers to various constants such as, for example, the blade geometry as well as the density of the air summarized together. Further $C_p$ refers to the power coefficient, which, in its turn, as illustrated, is dependent upon the wind speed $V_W$, the rotor speed $W_R$ and the angle position of the rotor blades, the so-called pitch angle $\beta$. This power coefficient distinguishes itself by a global maximum which, with increasing wind speeds $V_W$ shifts to greater rotor speeds $W_R$.

Figure 2:
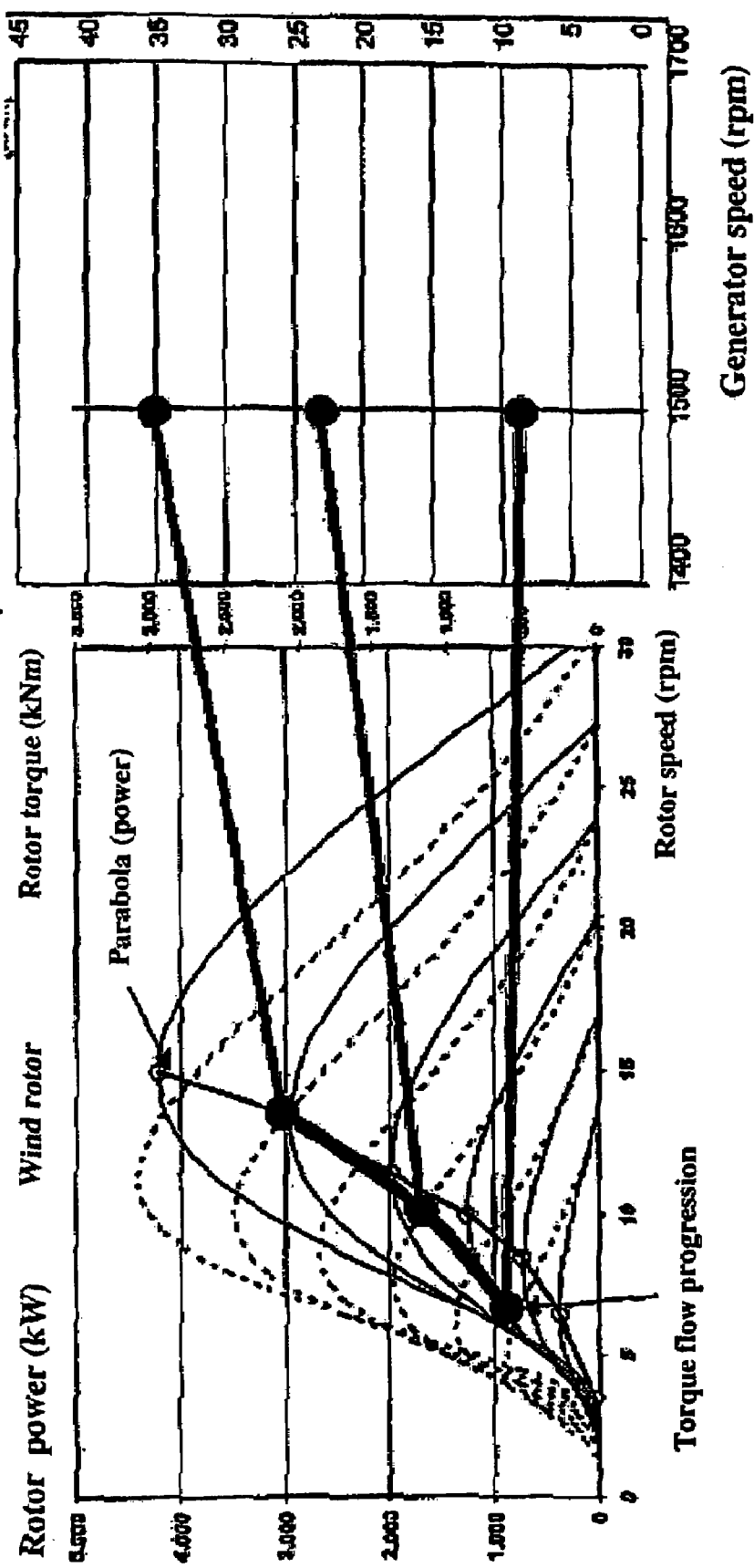
FIG. 2 shows schematically the effective power flow at the best point on a wind power plant.

FIG. 2 shows this connection through the illustration of the effective power of a wind rotor, taking into account various wind speeds. There is illustrated an array of curves (drawn-through curves) which exemplarily show the power taken in from the airflow by a wind rotor with 70 m diameter at a constant rotor blade position for the wind speeds 18 m/s, 16 m/s, 14 m/s, 12 m/s, 8 m/s. Characteristic is the shifting of the optimal rotor speed at higher levels with increasing wind speed. In each case the power maximums lie on a curve which is also designated as a parabola. A speed guiding along this curve of the optimal power input is designated in the following as power-optimal speed guiding for the input shaft of the invention-like drive line. In this way a variable speed plant can be operated with dependence upon the wind speeds available in each case at optimal power coefficients. In addition to the variable speed operation at partial loading, wind power plants which are typically laid out for certain nominal powers, connected with a nominal speed which is in each case achieved at full loading and is held there.

From FIG. 2 there is visible, by looking at the dotted array of curves as depicted, the torque of the wind rotor. The torque flow progressions as depicted are allocated in each case to the powers which are dependent upon the wind speed, i.e. there belongs to every torque an optimal power speed which however does not represent the maximum torque at the wind speed in question, but rather assumes a different value—refer on this to the bold-printed speed input curve in FIG. 2. With the torque put in by the wind rotor the electrical generator is started via the invention-like drive line. From FIG. 2 in which is illustrated a torque/speed ratio for a synchronous generator it can clearly be seen that for an imprinted grid frequency of 50 Hz on the drive shaft of the drive line, for the various different transferred torques, a constant speed of, in this example 1500 rpm output-side, was prescribed and could be kept to. If instead of a synchronous generator, a non-synchronous generator is used, then the situation will demonstrate itself as appropriate to the circumstances, since during operation in a linear field the output can be from such a steep torque/speed ratio that the speed of the drive shaft of the drive line will feature for the most part a constant level.

Figure 1:
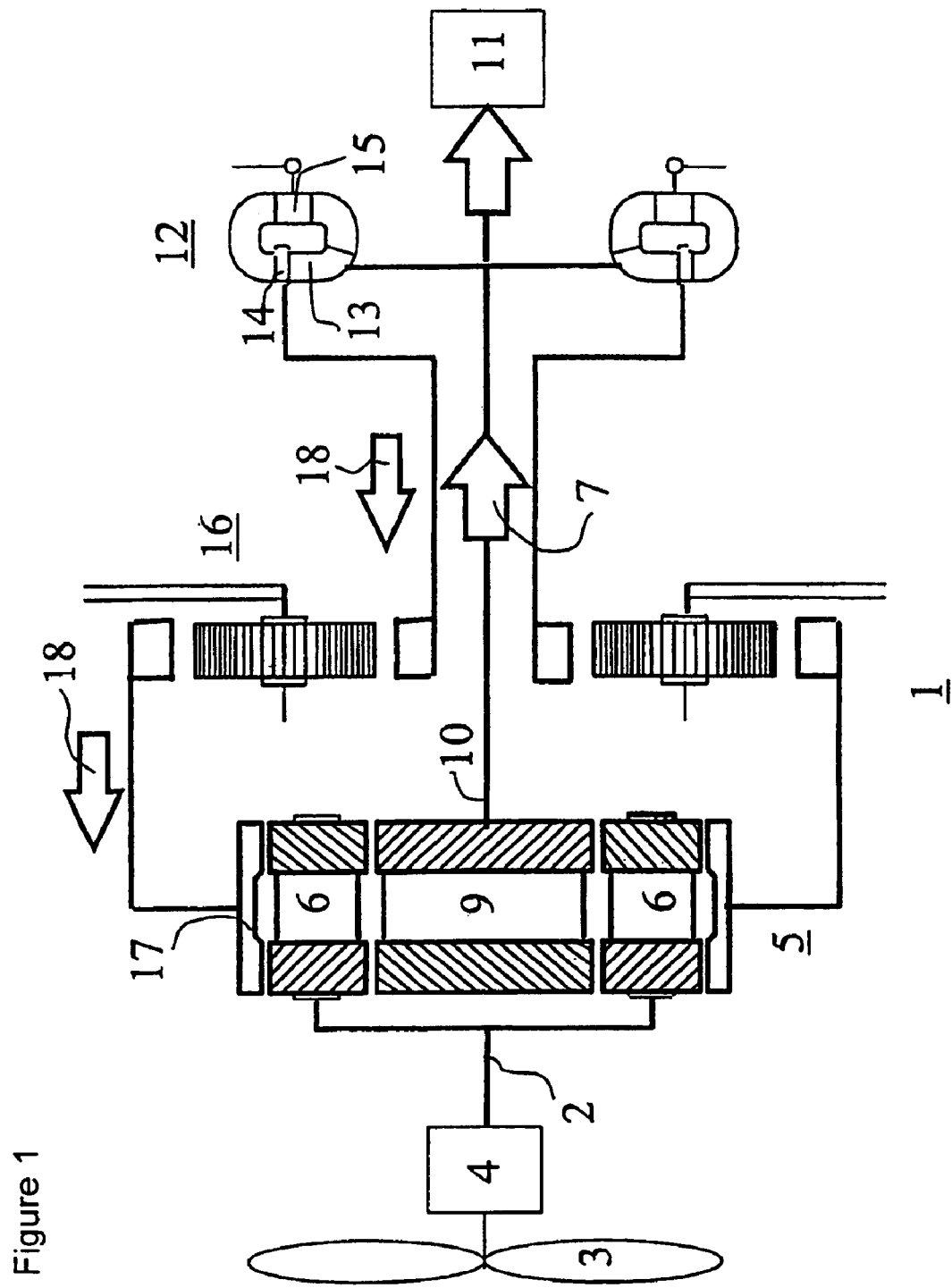
FIG. 1 is a schematic portrayal, according to the invention, of a power-distributor wind power plant with a servo-converter on the output side.

FIG. 1 shows a possible design layout of a drive line according to the invention 1, of which the input shaft with the rotor 3 is at least directly connected to the rotor 3 of a wind power machine. In the case submitted a transmission gear 4 with a constant transmission ratio is placed between the rotor 3 of the wind power machine and the input shaft 2. In the demonstration example illustrated here a planetary gear transmission 6 is used as power-distributor transmission 5 of the drive shaft 1, whereby the input shaft 2 is connected to the planetary gear transmission 6. In the power-distributor transmission there are now two power branches in existence, the first power branch 7 leads power via the sun wheel 9 to the output shaft 10 of the drive line. This output shaft 10 energizes, at the very least, directly the electrical generator 11 and is in effective connection with the hydrodynamic servo-converter 12. In addition hereto the output shaft 10 is, at the very least, directly connected with the pump wheel 13 of the hydrodynamic servo-converter 12. As reaction member 15 there is used in the hydrodynamic converter 12 a stator with positioning blades with which the power flow can be set onto the turbine wheel 14. Via the turbine wheel 14 there takes place, in turn, a power flowback which once again is transferred via a second, fixed planetary gear set 16 which for its part exercises its effect upon the power-distributor transmission 5 and thereby influences the velocity ratio. This illustrates the second power branch 18 of the power-distributor transmission which serves the power back-flow.

The invention-like drive line is now formed in design terms in such a way that by means of the choice of mechanical transfers in the power-distributor transmission as well as by means of the dimensioning of the converter, the parabolic characteristic curve of the optimal power intake is emulated by the wind power rotor 3. The point of departure for this is that for every wind speed there can be put in an ideal rotor speed for the maximum power intake out of the air flow. On this point reference is made to the previous statement on FIG. 2. As a further condition, at the same time, a constant output speed of the drive line for the electrical generator is also prescribed. In the case submitted this lies at 1500 rpm. The necessary circulation speeds of the transmission components of the power-distributor transmission, for example the outer wheel and the sun wheel, can now be established taking into account these specifications for each wind speed in the partial loading area. On this matter it is to be taken into account that the drive line must emulate the parabolic power intake characteristics for an, in principle, constant holding of the position of the reaction member 15 of the hydrodynamic servo-converter 12.

Figure 3:
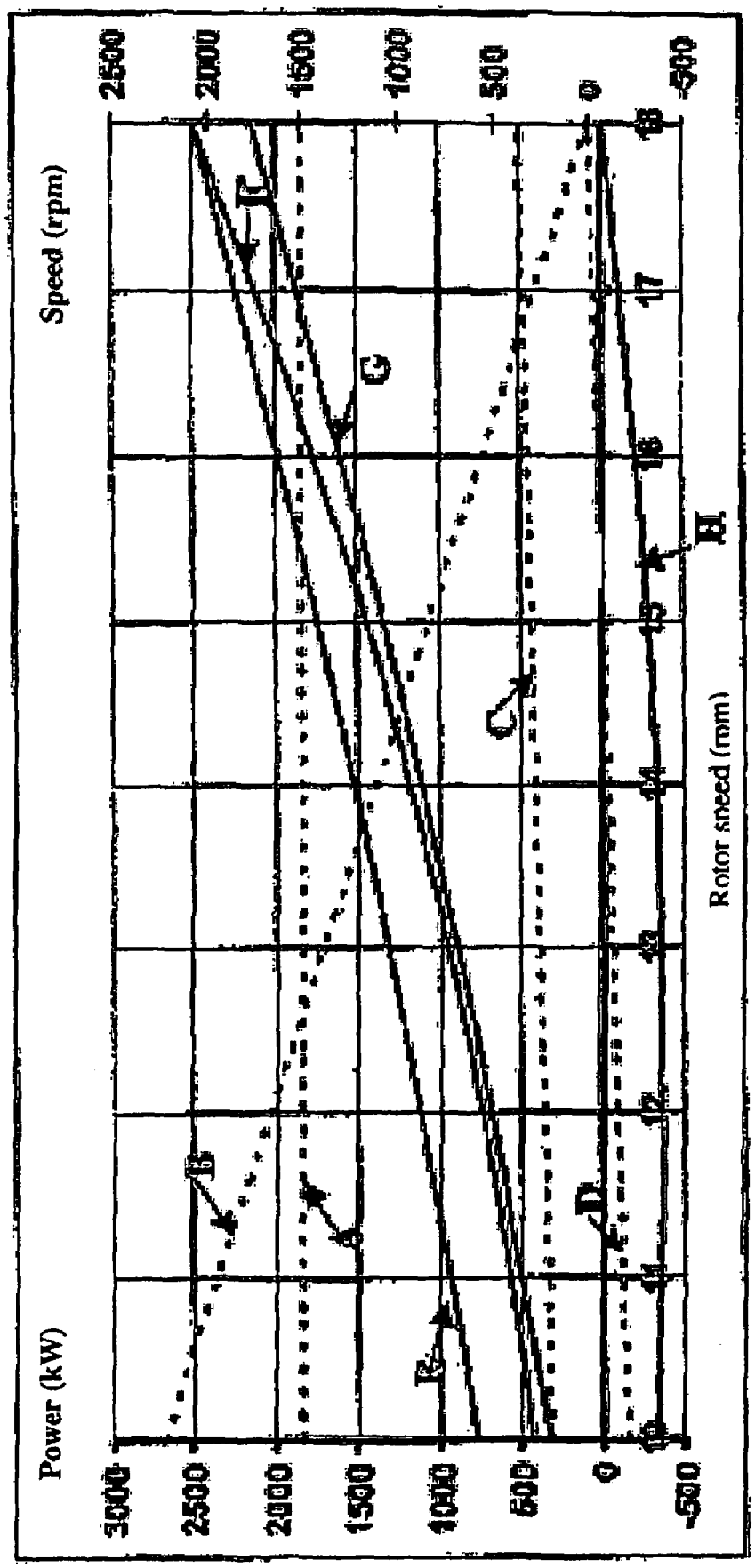
FIG. 3 illustrates the power flows and speeds of the individual branches of the mechanical-hydrodynamic drive line as dependent upon the wind turbine speed.

FIG. 3 illustrates the speeds setting themselves into the drive line as well as these in the individual branches transferring power. In each individual case, the curve A shows the speed of the output shaft 10, curve B shows the speed of the turbine wheel 14 of the hydrodynamic converter 12, curve C shows the speed of the input shaft 2 and the curve D shows the speed of the outer wheel 17 of the power-distributor 5. For the power flows the curve E illustrates the power taken in from the wind rotor, curve F is the power on the sun wheel 9, curve G the power transferred by the drive line, and curve H gives the power flowing back via the second power branch 18 from the hydrodynamic converter 12 onto the power-distributor transmission 5.

Figure 4:
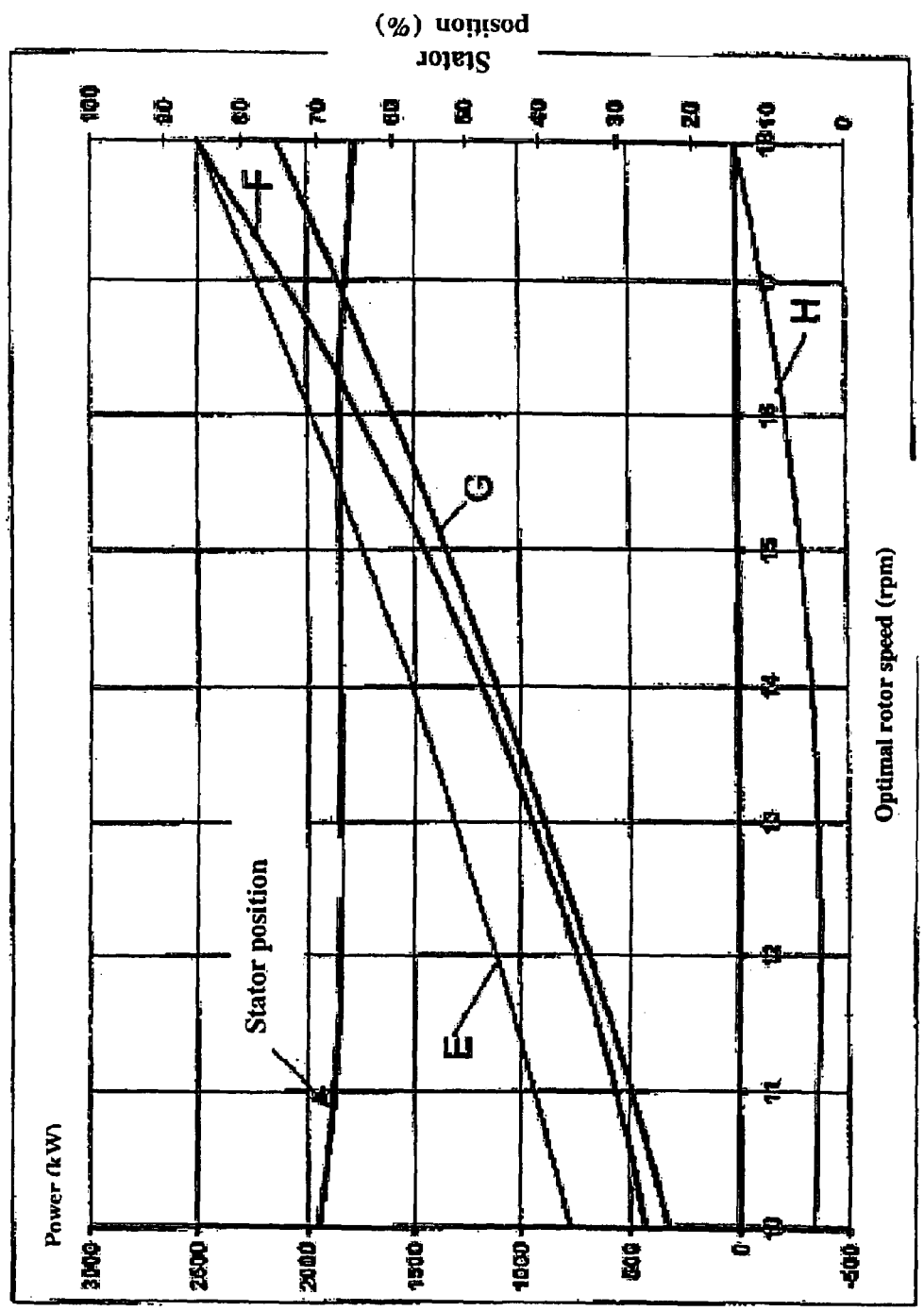
FIG. 4 illustrates the power flows and the setting of the reaction member of the mechanical-hydrodynamic drive line as dependent upon the wind turbine speed.

FIG. 4 shows once again the power flow for this execution example as well as the setting of the reaction member of the hydrodynamic servo-converter, in the case submitted, of the stator. The power flow curves E, F, G and H represent those from FIG. 3. It can be seen that at an optimal power intake along the parabola, which can be emulated by means of the characteristics of the drive line, it is possible to work throughout the entire illustrated partial loading area, with a persistently even level of guide vane position. This setting is, hereinafter, designated as the adjusted setting of the hydrodynamic converter. Therefore no regulation of the reaction member is necessary to attain the constant level of the output speed of the drive line for the feeding of the electrical generator at a simultaneously variable, optimal wind rotor speed. It must herewith be pointed out that the steepness of the parabola characterizing the power intake can be set by means of the transfer dimensioning of the components of the power-distributor transmission, just as well as by means of the dimensioning of the converter. This characteristic of the invention-like drive line is hereinafter referred to as self-regulation.

Figure 5:
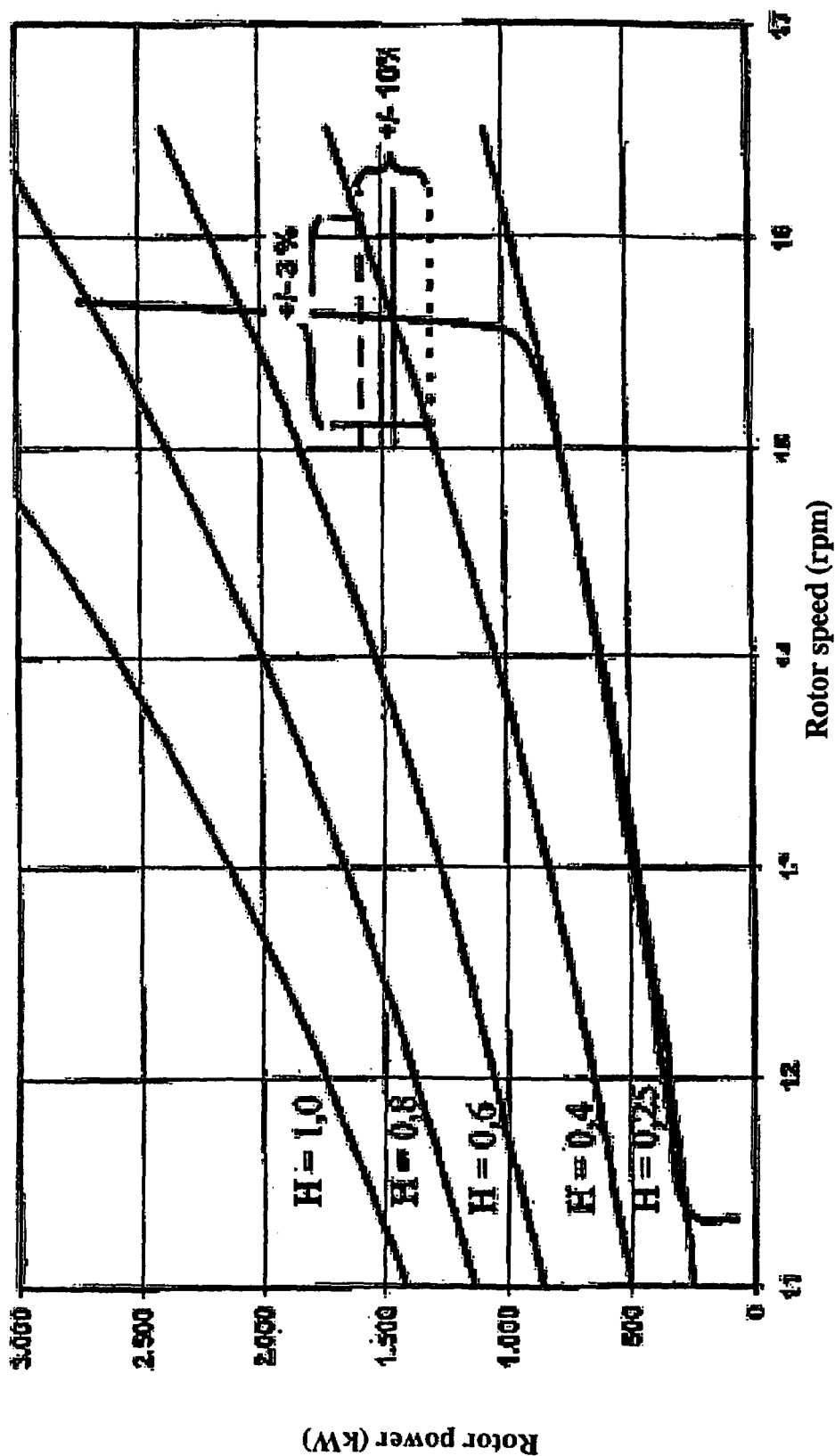
FIG. 5 shows the setting of a work point with a certain nominal speed of the wind turbine above a certain speed threshold area.

FIG. 5 now illustrates the case that the optimal power input parabola is left by means of the de-adjustment of the hydrodynamic servo-converter in order to imprint a certain nominal speed onto the wind power rotor which is above a certain speed threshold area and, in particular, to hold it at a constant speed even above this speed threshold. The illustrated array of curves represents a variety of stator positions (H=0.25-1.0). In the case submitted the hydrodynamic servo-converter is adjusted at a stator position of H=0.25.

Speeds which are lower than the threshold speed, which in the execution example submitted lies at 15.5 rpm, follow the ideal power intake parabola. This represents the previously illustrated situation of a speed guidance on a wind power turbine at the optimal power intake from the wind flow, whereby simultaneously the constant speed demanded of the electrical generator onto the output shaft of the drive line is adhered to.

Above the threshold speed, in the case submitted of 15.5 rpm, the line drive will, by means of a shifting of the reaction member of the hydrodynamic servo-converter, be set in such a way that the entire system of wind power rotor and drive line are lined up in a new work point on a new power intake parabola. Hereby the output speed of the drive line and thereby the speed of the electrical generator, continue to remain constant.

From FIG. 5 it can be seen that by means of the de-adjustment of the hydrodynamic servo-converter various different work points can be selected. This opens up the possibility of making settings for the speed of the wind power turbine, in the simplest of cases the speed will be limited in this way, and by the same token it is however also possible to set the work points for the desired speed of the wind power turbine along a curve which is dependent upon the torque taken in via the wind power turbine. In this way it is possible, in particular, to adapt the softness of the drive line to the limit of the full-loading operation of the wind power plant.

Around each work point which is set by means of the de-adjustment of the converter, there arises in its turn the parabolic power intake characteristic which is passed through at varying wind speeds. This situation is illustrated in FIG. 5. It must, hereby, be taken into account that the setting of a certain work point can be undertaken slowly, i.e. in an area of minutes, and is dependant upon medium wind speeds. The possible fluctuations around this work point, which will in each case be compensated for by the system characteristics of the drive line, are short-term effects such as fluctuations, in particular from gusts of wind such as will arise in the wind profile. This width of fluctuation should not exceed anything smaller than ±30% of the desired speed in the work point, preferably ±10% and in particular ±5%.

By means of the invention-like procedure above a speed threshold of the wind power turbine by means of the de-adjustment of a mechanically hydrodynamic drive line otherwise adapted to the characteristics of the power intake with a power-distributor transmission and a hydrodynamic servo-converter it is successfully possible to combine a sealing off of the wind power turbine during the crossover between partial loading and other operational points and a limitation of the speed on the limitation of noise development with a high softness and a self-regulating characteristic of the drive line. In particular, the latter is, as shown in FIG. 6, an advantage when wind gusts arise in contrast to systems with a sealing off by means of the momentum which an electrical generator controlled by a converter generates onto the power take-off side of the drive line.

Figure 6:
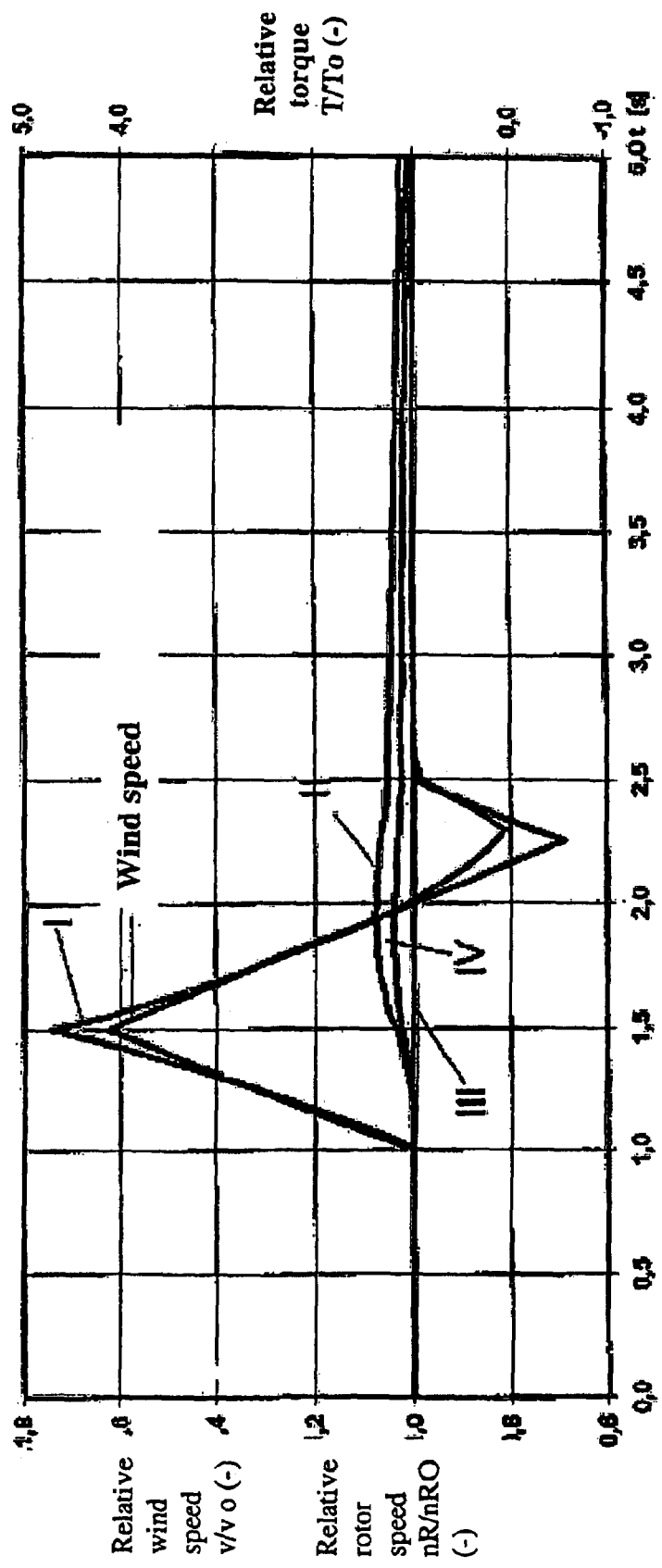
FIG. 6 shows the influence of a gust of wind on a wind power plant with guided wind turbine speed in fixed speed and variable speed operation by means of overlay transmission and servo-converter.

In FIG. 6 there is shown individually the occurrence of a gust of wind in a temporal flow progression through the remit of the relative wind speed. As a reaction a comparison is made between a system with a drive line controlled according to the invention-like procedure with a system with a completely fixed layout. The fixed layout system has to cushion the impact of the additional momentum arising from the gust of wind and impacting upon the wind power turbine (refer torque flow progression according to curve 1)), whilst the invention-like system merely leaves the work point along the power intake parabola and, as a consequence of the gust of wind, there arises a certain rise in speed (curve IV) and thereby also an additional power intake by means of the moment of inertia of wind rotor and transmission and thereby demonstrates a substantial reduction of momentum (curve II) in the drive line, which substantially reduces the cases of overloading for the layout of the drive line. The invention-like drive line thereby distinguishes itself by virtue of a power impact reduction. After the gust of wind the speed of the wind power rotor evens out again on account of the self-regulating effect of the setting of the work points and the additionally existing kinetic energy in the wind rotor and the drive line are passed on to the generator. In contrast to this, the fixed system takes in no additional power when a gust of wind arises. It can be clearly seen that the invention-like system reacts substantially more softly, which is in particular of advantage for the operating life-span of the wind power plant because of the reduction in the level of cases of overloading. This effect is to be attributed to a short energy storage of the mechanically hydrodynamic drive line.

Figure 7A:
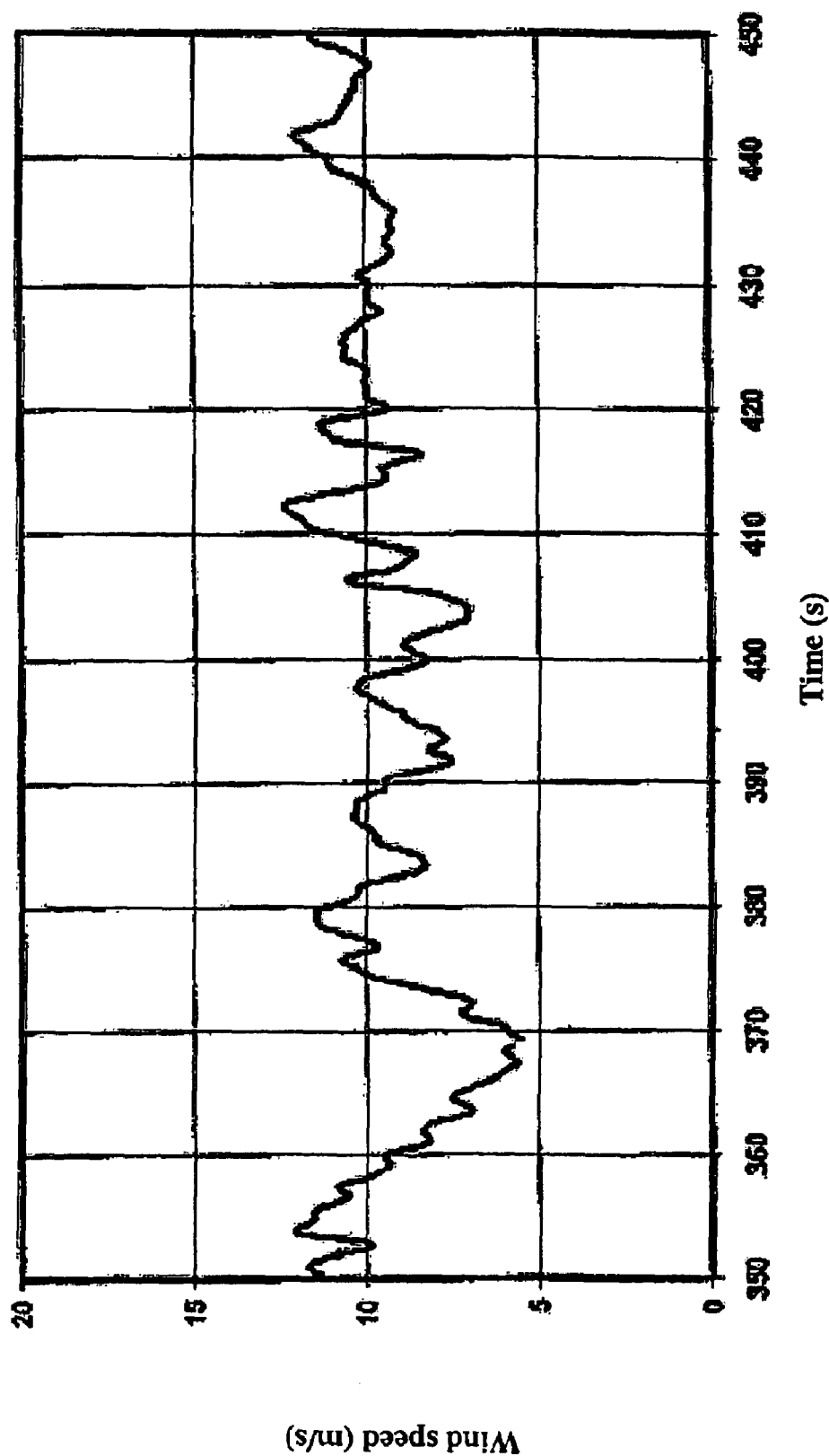
Figure 7B:
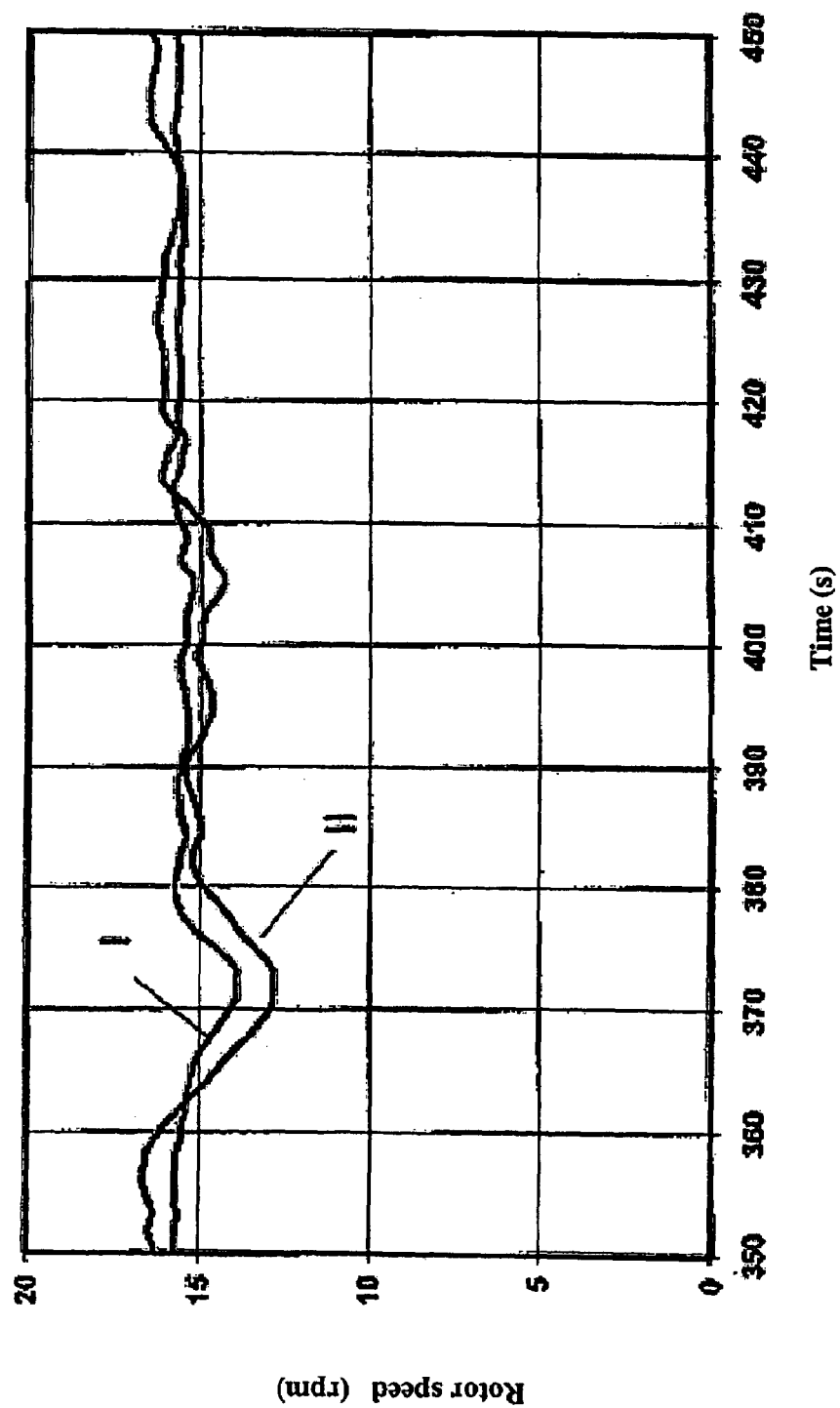

Taking as the point of departure—a typical wind profile such as is shown in FIG. 7a, it is possible to compare an appropriately electronically controlled state-of-the-art system II with the invention-like drive line I. FIG. 7b shows the flow progression of the rotor speeds and makes it clear that the invention-like drive line I features lower speed deflection. Furthermore it can be seen from FIG. 7c that, in contrast to the electronically controlled system, the generator speed can be kept to a substantial extent at a constant level. In addition FIG. 7d shows that with the invention-like drive line I it is possible to convert power impacts into power itself and thereby to achieve a clearly much smoother torque flow progression.

Figure 8:
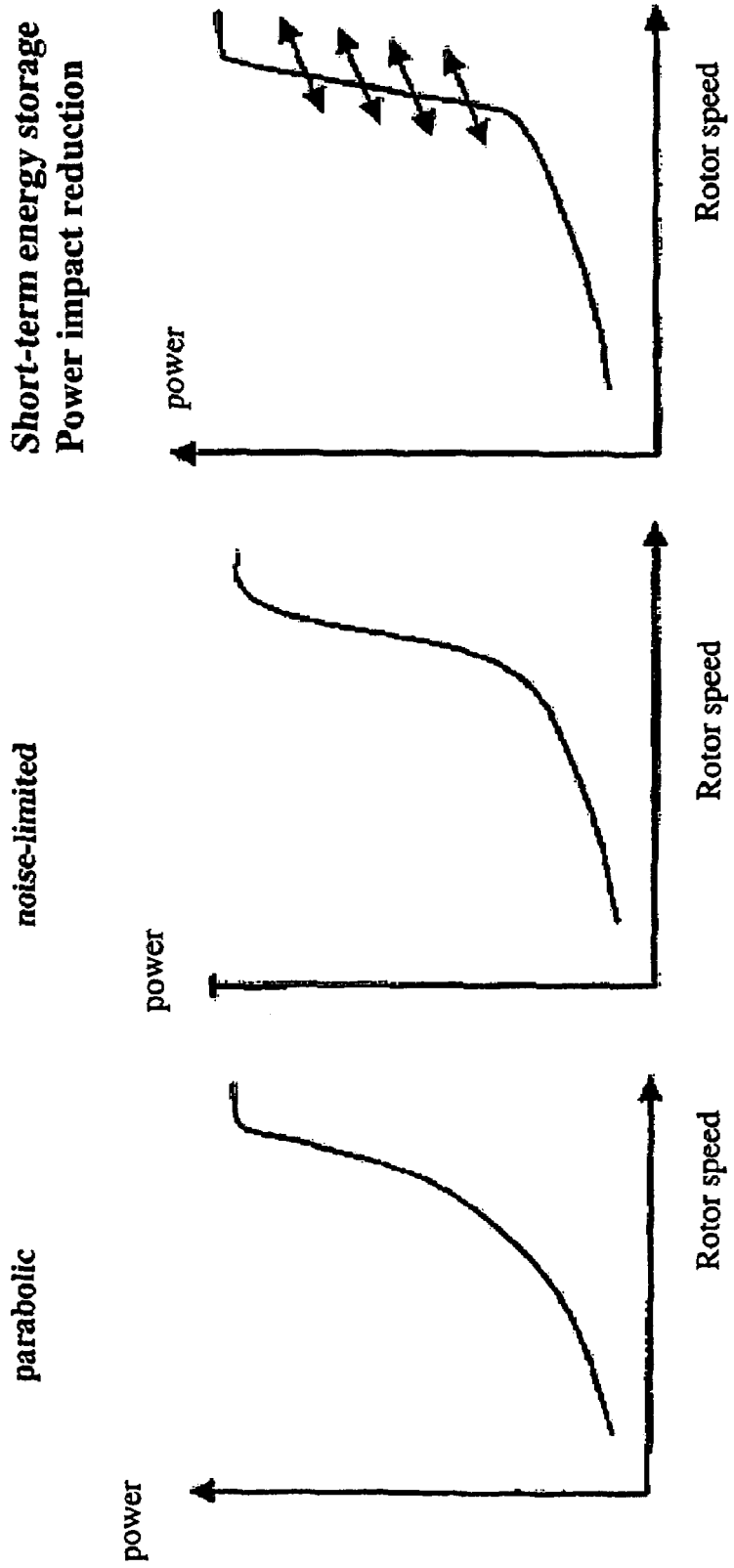
FIG. 8 Regulation demands made upon a drive line for wind power plants

FIG. 8 summarizes the various different control requirements upon a drive line for a wind power plant (parabolic, noise-limited and short-term energy storage with power impact reduction). The optimal power speed guidance of the wind rotor for a limitation of noise development of the wind power rotor above a certain threshold speed is abandoned and the speed of the input shaft of the drive line is guided along a steeper flow progression curve. An important advantage of the invention-like drive line is that in every work point of this rotor speed nominal flow progression the property of self-regulation is activated and thus a short-term energy storage and a power impact reduction are attained.

The invention claimed is:

1. A method of transferring power from a wind or water turbine to a generator, comprising:
   providing a driveline that transfers power from the turbine to the electric generator connected to an electricity grid of constant grid frequency;
   splitting power from the turbine into a first power branch by means of a power distribution transmission arranged on the input side of the drive line, the first power branch driving the electric generator at substantially constant speed;
   providing a hydrodynamic converter with an adjustable reaction member that connects the first power branch with the second power branch on the output side of the driveline; and
   setting the reaction member of the hydrodynamic converter to a constant position for a turbine speed below a selected threshold and controlling the reaction member to maintain a medium speed of the turbine above the threshold as a function of the momentum picked up by the turbine.

2. The method of claim 1, wherein a wind power rotor is used as the turbine and the speed of the turbine above the threshold is controlled in such a way that the wind power rotor does not exceed a given noise level.

3. The method of claim 2, wherein a speed of the turbine is constant above the threshold.

4. The method of claim 2, wherein output shaft of the driveline rotates at a constant speed.

5. The method of claim 2, wherein the turbine and the driveline demonstrate the same speed sensitivity in input power.

6. The method of claim 2, wherein the threshold is variable.

7. The method of claim 2, wherein by means of establishing the threshold a varying softness and a short-term energy storage capability of the driveline is defined.

8. The method of claim 1, wherein the speed of the turbine is constant above the threshold.

9. The method of claim 8, wherein the turbine and the driveline demonstrate the same speed sensitivity in input power.

10. The method of claim 8, wherein the threshold is variable.

11. The method of claim 8, wherein by means of establishing the threshold a varying softness and a short-term energy storage capability of the driveline is defined.

12. The method of claim 1, wherein an output shaft of the driveline rotates at a constant speed.

13. The method of claim 12, wherein the turbine and the driveline demonstrate the same speed sensitivity in input power.

14. The method of claim 12, wherein the threshold is variable.

15. The method of claim 12, wherein by means of establishing the threshold a varying softness and a short-term energy storage capability of the driveline is defined.

16. The method of claim 1, wherein the turbine and the driveline demonstrate the same speed sensitivity in input power.

17. The method of claim 16, wherein the threshold is variable.

18. The method of claim 1, wherein the threshold is variable.

19. The method of claim 1, wherein by means of establishing the threshold a varying softness and a short-term energy storage capability of the driveline is defined.

20. The method of claim 1, wherein for every setting of the reaction member of the hydrodynamic converter there exists a parabolic flow progression for the turbine.

* * * * *